May 18, 1943. L. P. SAVAGE 2,319,559
BEET HARVESTING APPARATUS
Filed Aug. 25, 1941 3 Sheets-Sheet 1
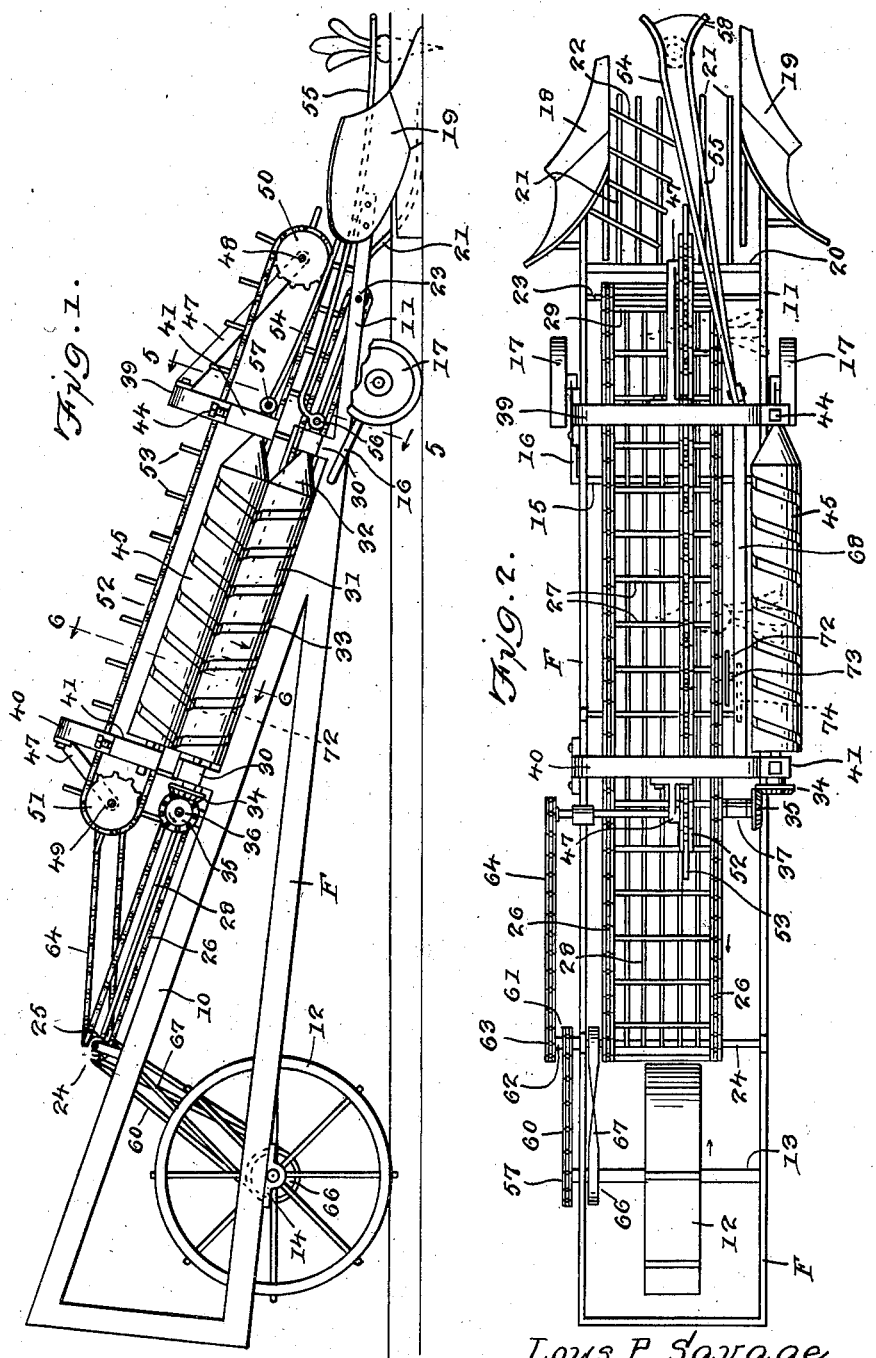
Loys P. Savage
INVENTOR
BY Victor J. Evans & Co.
ATTORNEYS May 18, 1943.  L. P. SAVAGE  2,319,559
BEET HARVESTING APPARATUS
Filed Aug. 25, 1941  3 Sheets-Sheet 2
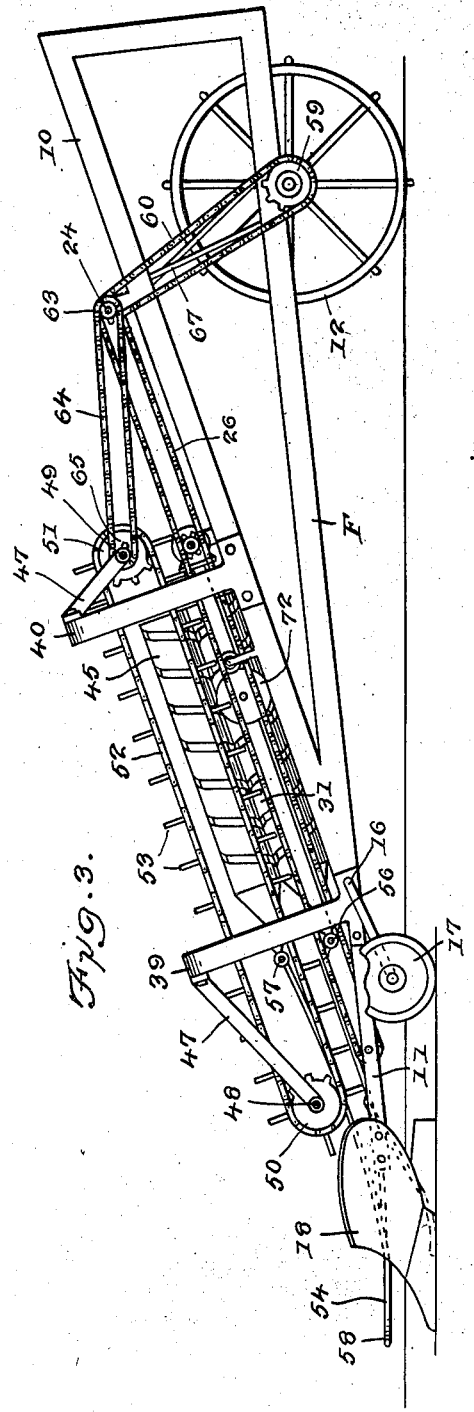
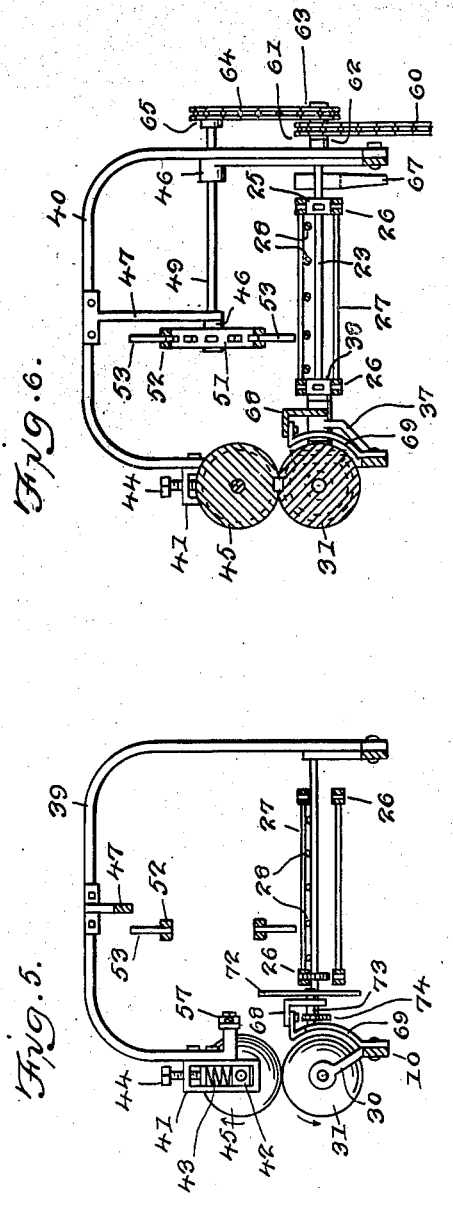
Loys P. Savage
INVENTOR
BY Victor J. Evans & Co.
ATTORNEYS

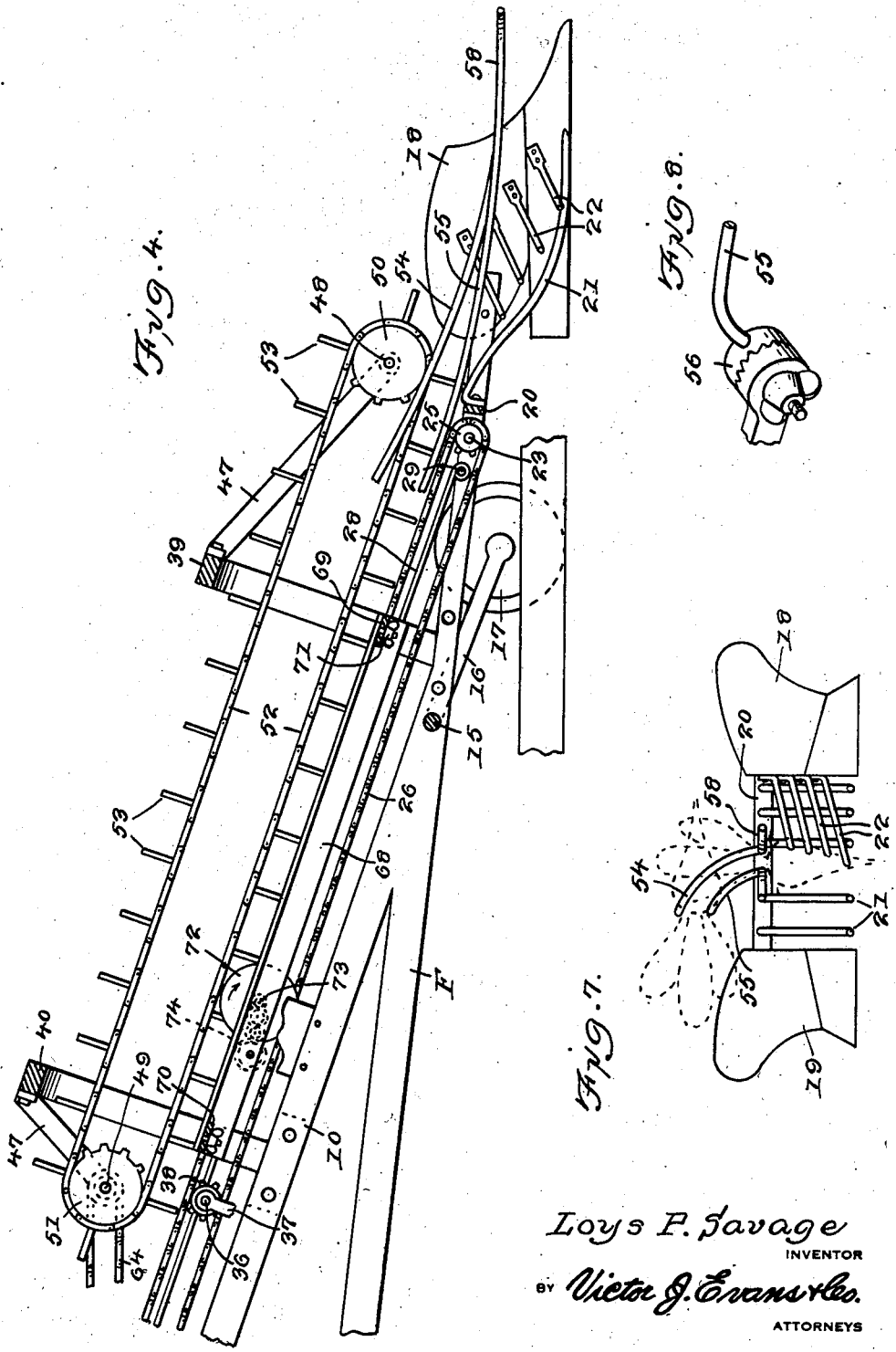

Patented May 18, 1943

2,319,559

UNITED STATES PATENT OFFICE 2,319,559

BEET HARVESTING APPARATUS

Loys Patrick Savage, Bonner, Mont.

Application August 25, 1941, Serial No. 408,239

4 Claims. (Cl. 55—9)

The present invention relates to new and useful improvements in apparatus for harvesting and cutting sugar beets and the like.

An object of the invention is to provide a beet harvesting and cutting apparatus of generally improved design.

Another object of the invention is the provision of a beet harvesting apparatus which will harvest and cut beets rapidly and accurately.

A further object of the invention is the provision of a beet harvesting apparatus which elevates and cuts the beets without mutilation or injury.

Still another object of the invention is the provision of apparatus of the above character which handles the beets so as to turn the same to a transversely disposed position at the forward end of the apparatus.

A still further object of the invention is the provision of a harvesting apparatus having roller means operative to yieldingly pull the beet tops laterally of the frame.

A still further object of the invention is the provision of beet harvesting apparatus which is efficient and reliable in operation and relatively simple in construction.

Other objects and advantages of the invention will become apparent as the description progresses.

In the accompanying drawings forming a part of this specification and in which like numerals are employed to designate corresponding parts throughout;

Figure 1 is an elevational view of the apparatus in operative position as viewed from the right hand side thereof, Figure 2 is a top plan view of the same, Figure 3 is a side elevational view as viewed from the left hand side of the apparatus, Figure 4 is a longitudinal sectional view through the same, Figures 5 and 6 are transverse sectional views taken on lines 5—5 and 6—6 respectively of Figure 1, Figure 7 is a fragmentary front elevational view of the apparatus, and Figure 8 is a detail perspective view of one of the supports.

Referring in detail to the drawings, wherein for the purpose of illustration is shown a preferred example of the invention, F generally designates the frame of the apparatus which is in the form of a longitudinally elongated rectangular shaped structure having triangular shaped side sections 10 formed with relatively narrow forwardly projecting side bars 11. The rear of the frame F is supported on a relatively large bull wheel 12 fixed on a transversely extending axle 13 journaled in bearings 14 attached to the bottom bars of the side sections. The front of the frame is supported on an axle 15 formed with side crank arms 16 on the outer ends of which are rotatably mounted a pair of transversely spaced carrier wheels 17.

To the left forward frame bar 11 is secured a plow 18 disposed so that its mold board will throw the earth outwardly to the left of the frame. To the complementary right side frame bar 11 is secured a plow 19 disposed to throw the earth to the right of the frame and mounted so that it assumes a position forwardly of the plow 18, as clearly shown at Figure 2. To a transverse frame bar 20, connecting the forward portions of the frame sides, are attached a plurality of forwardly projecting digging fingers 21 disposed in spaced relation between the plows and curved longitudinally so that the forward portions extend in a horizontal plane approximately parallel with the bottom cutting edges of the plows. The forward pointed ends of the fingers 21 terminate rearwardly of the front ends of the plow shares.

To the left plow 18 are connected a plurality of ribs 22 disposed to assume curved approximately transversely extending positions in successively elevated arrangement. These ribs, which may be four in number, are advantageously mounted so that their inner flattened ends are riveted or otherwise fastened to the inner land side of the plow 18 and curve downwardly therefrom immediately above and across the fingers 21 in directions oblique to the fingers with their outer ends terminating adjacent the center of the frame.

On transverse shafts 23 and 24 rotatably journaled on forward and rear ends of the frame are fixed transversely spaced sprockets 25 having trained thereover a pair of longitudinally directed endless chains 26. Secured to and extending between these chains, at uniformly spaced intervals, are a plurality of conveyor bars 27 designed to carry the beets upwardly and rearwardly along the frame, upon a plurality of transversely spaced longitudinally directed rods 28. As will be seen from Figures 1 and 2 the rods 28 are securely fastened, at their forward ends, to a transverse bar 29 while the rear ends are looped about the rear conveyor shaft 24.

In a pair of upstanding bearing brackets 30 formed in longitudinally spaced relation on the right side of the same are rotatably supported the end journals of a roller 31 tapered at the front end to form a feed cone 32 and formed with a spiral groove or thread 33. To the rear journal of the roller 31 is secured a beveled gear 34 in mesh with the right angular beveled gear 35 fixed on a transverse stub shaft 36 journaled in a bearing bracket 37 mounted on the frame. On the inner end of the shaft 36 is fixed a sprocket 38 meshing with one of the conveyor chains 26 and driven thereby to rotate the roller.

Rigidly fastened to the left side of the frame F and extending transversely thereover at positions registering with those of the brackets 30 are a pair of arched support brackets 39 and 40 of approximately U-shaped formation. At the portions of these brackets depending over the right side of the machine are secured vertically elongated slot defining frame members 41, each of which has a bearing block 42 fitted therein for vertical sliding movement yieldingly urged to downward position by a spring 43, the pressure of which is regulated by a screw 44. The blocks 42 in the respective bracket frames rotatably support the end journals of an upper roller 45 similar to the roller 31, with reversed spiralling of its groove, and disposed in complemental parallel relation with the lower roller. As will be noted the upper roller 45 is yieldingly maintained in frictional contact with the roller 31 for rotation with the latter.

In bearing sleeves 46 formed in the outer ends of a plurality of bracket arms 47 attached to the arched members 39 and 40 are journaled a pair of transverse longitudinally spaced shafts 48 and 49 having sprocket wheels 50 and 51 fastened thereon. Over these sprockets is trained an endless chain 52 having attached thereto, at spaced intervals, a plurality of outwardly projecting prongs 53. As clearly shown at Figures 2 and 4, the vertically disposed prong carrying chain 52 extends above the right side of the bars 27 of the elevating conveyor and projects forwardly thereof in position to push the beets onto the conveyor.

On the front portion of the implement are mounted a pair of elongated finger elements 54 and 55 associated to form therebetween a guide slot. In the embodiment shown, these elements constitute elongated rods advantageously of spring steel having the inner end of the rod 55 attached to the forward bearing bracket 30 through the medium of a rotatably adjustable ratchet connection 56 while the complementary rod 54 is connected, through a similar connection 57, with the lower end of the depending arm of the cross piece 39. These rods are bent so that they are bowed downward, as shown at Figure 4, and project obliquely from their side connections so that their forward ends project forwardly of the fingers 21 and centrally of the frame and are bent outwardly to provide curved and diverging end portions 58. At their forward ends these rods are normally arranged to assume transversely spaced positions and gradually spiral about an intermediate axis to terminate in vertically spaced arrangement at their inner ends, forming a guide slot therebetween gradually defining a helix twisting from the horizontal to the vertical between the ends of these rods. The forward curved ends of the rods are normally adjusted to assume aboveground positions designed to embrace the inner reduced neck portions of the beet tops in advance of the elevation or digging up of the beets.

On one end of the rear shaft 13 driven with the bull wheel 12 is secured a sprocket wheel 59 having an endless chain 60 trained thereover. This chain is also trained over a sprocket 61 fixed on a sleeve 62 rotatably mounted on an end of the cross shaft 24. On this sleeve is also secured a second sprocket wheel 63 over which is trained an endless drive chain 64 connecting with a sprocket 65 fixed on the outer end of the shaft 49, providing means for driving the endless chain 52. Over a pulley 66 secured on shaft 13 is trained a crossed belt 67 drivably connecting with a pulley fixed on shaft 24 for driving this shaft and the endless conveyor chains 26.

Mounted longitudinally on the frame F at the right side thereof is an angle bar 68 slidably supported on a pair of brackets 69 attached to the side of the frame. The upper horizontal flange of this bar advantageously carries a pair of depending threaded studs 70 which extend through slots in the brackets 69 and carry thumb screws 71 whereby the angle bar may be adjusted transversely of the frame. As shown to advantage at Figures 2, 4, 5 and 6 this angle bar is arranged parallel with and inwardly of the lower roller 31 throughout the full length of the latter and laterally of the right side of the conveyor. Between the right chain of the conveyor and this angle bar, adjacent the rear end of the latter, is mounted a rotary cutter 72 in the form of a disk having a cutting periphery mounted in a vertical plane on a stub shaft 73 and rotated through gearing 74 which may advantageously connect with and be driven by a side chain 26 of the conveyor.

During operation, the apparatus or implement may be drawn, as by a tractor, along a row of beets with the spaced plows 18 and 19 at the front thereof straddling the beet row and moving through the ground to form furrows at each side. This movement of the plows loosens and pulverizes the earth of the row so that the curved fingers 21 readily lift the beets together with adjacent and adhering earth from the ground. As the implement moves along the row the forward ends of the slot defining elements 54 and 55 engage the necks of the beet tops and as the digging fingers elevate the beets the bottom end of each beet body is directed through a sidewise and upward movement by the guide ribs 22 in correspondence with the curvature of the guide rods so that when the beet attains a position at the top inner portion of the fingers 21 it has been turned from a vertical to an approximately horizontally transversely disposed position. At this time the radial projections 53 successively engage the beets and thrust the same onto the front end of the elevating conveyor.

As the beets are successively carried in transverse arrangement rearwardly of the frame the longitudinally extending spiral guide slot defined by the rods 54 and 55 guide the same so that the tops are drawn toward the right hand side of the implement and pass through the gap between the bearing brackets 30 and 39. In this position the top or head leaves of the beet are directed into the bite of the rollers 31 and 45 which, due to the fact that at the contact line or bite these rollers move outwardly of the frame, pull the beet toward the rollers until the enlarged shoulder portion of the beet body is brought against the longitudinal guide bar 68. As this bar prevents further side movement of the beet the spring mounting of the upper roller maintains tension on the beet top with slippage of the rollers thereon while the beet continues to move rearwardly along the guide until it reaches the rotary cutter disk 72 which severs the top from the beet body. It is possible to regulate the transverse cut effected by the disk by transverse adjustment of the cutter guide 68 on its support brackets, with reference to the cutter, so as to cut a predetermined portion of the beet crown from the body with the top or to regulate the cut longitudinally of the beet as may be desired.

After the cutting operation the rollers eject the severed top laterally of the frame to deposit the same on the ground or in a suitable receptacle while the beet body is carried to the rear end of the conveyor and discharged therefrom into a suitable container. As will be noted, the digging fingers 21 gently elevate the beets with clinging earth which is removed during the progress of the beet along the implement. Thus, the guide ribs 22 initially agitate the same to remove part of the soil while most of the remainder is separated therefrom during its movement along the open mesh bottom forming rods 28 under the action of the conveyor. It will also be observed that the ribs 22, being inclined from the transverse on the fingers 21, direct the earth removed from the beet toward the right side of the apparatus and tend to discharge it rearwardly of the advanced right plow 19.

This construction provides an apparatus which can handle beets rapidly and without injury and which will effect accurate cutting of the tops on a predetermined cutting line.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In beet harvesting apparatus, an elongated wheel supported frame, a conveyor mounted on the frame for carrying beets from the front portion to the rear of the frame, a plurality of digging fingers attached to and projecting from the forward portion of the frame, a plurality of ribs extending in approximately transverse positions across the digging fingers, means attached to and projecting forwardly of the frame defining a spiral guide slot engageable with the necks of the beet tops whereby to tilt the beets in cooperation with the ribs to transversely extending position on the forward part of the frame, means for thrusting the transversely disposed beets onto the front of the conveyor, a longitudinal guide member supported on one side of the frame and mounted for transverse adjustment, a rotary cutter wheel mounted inwardly of the guide member, and a pair of spiral rollers rotatably mounted on one side of the frame adapted to engage the beet tops to yieldingly hold the beets against the guide member in advance of the cutter.

2. In a beet harvester, an elongated body frame, a bull wheel supporting the rear of the said frame, a pair of carrier wheels supporting the front of the said frame, said wheels being disposed to support the frame so that it assumes a longitudinally inclined position elevated at the rear end, a pair of plows secured to the front of the frame in transversely spaced relation, a plurality of digging fingers attached to the frame and projecting forwardly thereof between the plows, the forward portions of the fingers being disposed in beet digging arrangement, a plurality of ribs attached to one of the plows and extending in nearly transverse positions therefrom over the digging fingers, a pair of guide rods attached to the frame and projecting forwardly thereof in oblique arrangement, the said rods being disposed to form a slot therebetween adapted to engage the heads of the beets to guide the same from the center to the side of the frame and through a tilting movement wherein the beets are swung from vertical positions to transversely extending positions on the forward portion of the frame, a conveyor adapted to carry the beets along the frame to the rear thereof, a pronged endless chain operable to engage the transversely disposed beets and thrust the same upon the front of the conveyor, a cutter rotatably mounted on the frame, and means for directing the beets in predetermined cutting position to the said cutter.

3. In beet harvesting apparatus including a frame having a conveyor adapted to carry beets from the front to the rear portion thereof, digging means mounted at the front of the frame including a plurality of downwardly curved fingers projecting forwardly of the frame, a plurality of ribs extending diagonally across the said fingers, and means attached to and extending forwardly of the frame defining a longitudinally curved spiral guide slot adapted to engage the necks of the beet tops whereby to cause elevation and tilting of beets in cooperation with the fingers and ribs so as to deposit the beets in a transverse position on the front of the conveyor with the tops directed toward a predetermined side of the frame.

4. In a beet harvesting apparatus, the combination with a wheeled frame having a conveyor mounted thereon adapted to carry beets from the front toward the rear of the frame, of digging means disposed forwardly of the frame including a pair of forwardly directed lifting fingers, a series of ribs extending diagonally across the said fingers, and a pair of rods attached to and projecting forwardly of the frame above the fingers and ribs, the said rods being disposed in spiral relation so as to engage the beet tops whereby to lift and tilt the beets so as to deposit the same in transverse position on the front of the conveyor with the tops directed toward a predetermined side of the frame.

LOYS PATRICK SAVAGE.